Figure 6:
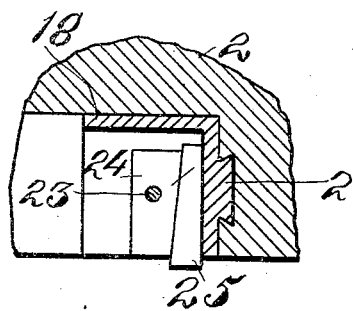

No. 835,697. PATENTED NOV. 13, 1906.
W. N. APPLETON.
LINK FORMING MACHINE.
APPLICATION FILED DEC. 1, 1905.
2 SHEETS—SHEET 1.
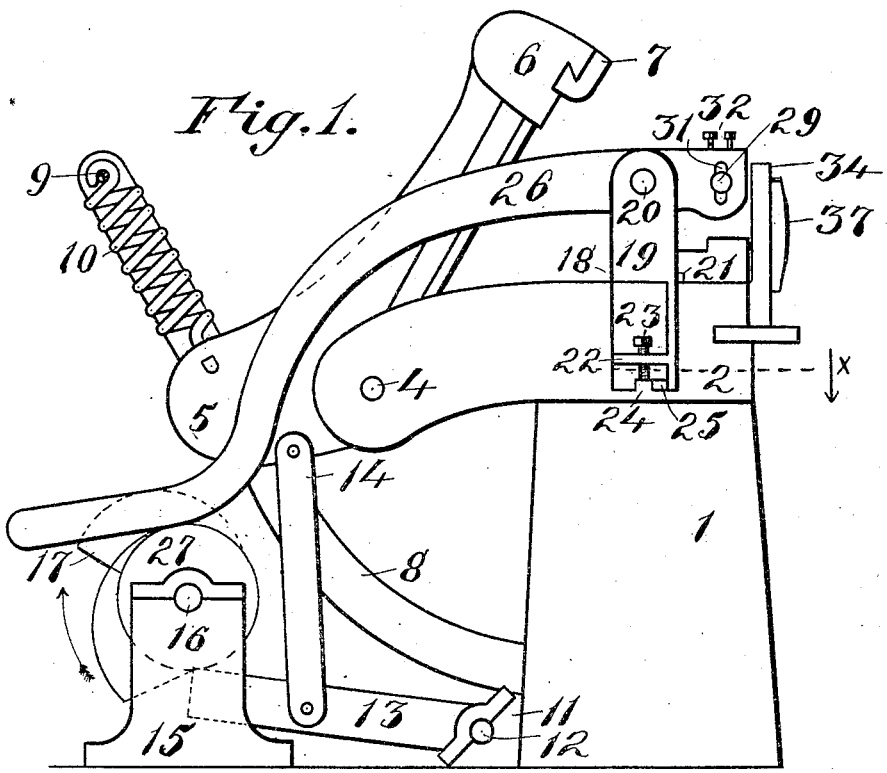
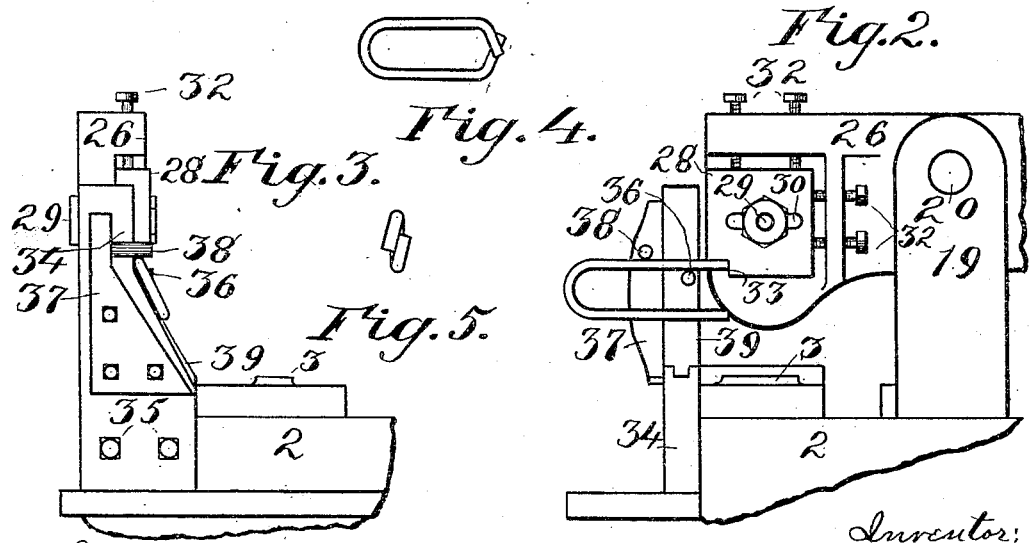
Witnesses:
A. E. Kling
Glenara Fox
Inventor:
W. N. Appleton,
by C. E. Humphrey,
Atty.

No. 835,697. PATENTED NOV. 13, 1906.
W. N. APPLETON.
LINK FORMING MACHINE.
APPLICATION FILED DEC. 1, 1905.

2 SHEETS—SHEET 2.

Witnesses:
Edna Bortz
Glenara Fox

Inventor,
W. N. Appleton,
by C. E. Humphrey
Atty.

UNITED STATES PATENT OFFICE.

WALLACE N. APPLETON, OF KENT, OHIO, ASSIGNOR OF ONE-SIXTH TO GEORGE L. DARROW, OF HUDSON TOWNSHIP, OHIO, AND ONE-SIXTH TO WILLIAM T. VAUGHAN, OF AKRON, OHIO.

LINK-FORMING MACHINE.

No. 835,697. Specification of Letters Patent. Patented Nov. 13, 1906.

Application filed December 1, 1905. Serial No. 289,880.

*To all whom it may concern:*

Be it known that I, WALLACE N. APPLETON, a citizen of the United States, residing at Kent, in the county of Portage and State of Ohio, have invented new and useful Improvements in Link-Forming Machines, of which the following is a specification.

My invention relates to machines for shaping chain-links preparatory to the welding thereof.

The object of this invention is to bring the ends of chain-links into proper shape by the use of suitable devices, so that the strokes of the power-hammer will properly weld them together.

Certain kinds of chains are made up of unusually elongated links as contradistinguished from the more common kinds, which are oval or nearly circular, and the links which are used in the former kind of chains are furnished to the chain-makers in the form of an elongated perfect U without scarfing or with their ends bent inward, and hence previous to the welding the operator is required to bend or form the ends thereof into such a condition that the application of the welding-hammer will nicely unite them. This operation is usually done by bending the ends of the links around the nipple or male die on the anvil-block by repeated blows of a hand-hammer; but as this takes time, especially where large links are used, it frequently happens that the temperature of the link falls below welding heat and a reheating is required, which involves a serious loss of time, and consequently money, to the operator; and therefore the primary object of this invention is to provide suitable means which will effectually shape the links when heated for welding so quickly that one heating thereof suffices.

The invention further aims to place this mechanism in such a position with respect to a welding-hammer that it can be operated by the power ordinarily used in the operation of the hammer and so close to the dies used in welding the link as to make it exceedingly convenient and readily serviceable to the chain-maker.

With the foregoing and other objects in view the invention consists of the novel construction, combination, and arrangement of parts constituting the invention to be hereinafter referred to and illustrated in the accompanying drawings, which form a part of this specification, in which is shown the preferred embodiment of the invention; but it is to be understood that changes, variations, and modifications can be resorted to which come within the scope of the claims hereunto appended.

Figure 7:
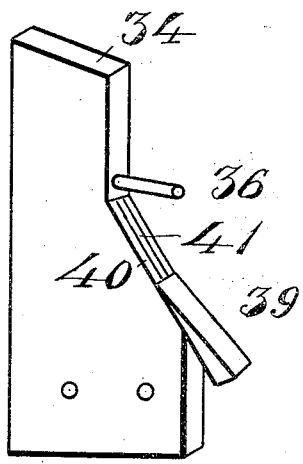

In the drawings, in which similar reference-numerals indicate like parts in the different figures, Figure 1 is a side elevation of my improved device. Fig. 2 is an enlarged detail of that portion of my device by which the links are shaped. Fig. 3 is a front elevation looking from the left of Fig. 2. Fig. 4 is an elevation of a chain-link after being operated upon by this device; Fig. 5, an end view of Fig. 4. Fig. 6 is a sectional view on line $x$ of Fig. 1; and Fig. 7 is a detailed view, enlarged, of a portion of the mechanism used in forming the link.

Before giving a detail description of this device it will be stated that I prefer to attach the same to the frame of a power-hammer of the type shown and described in United States Letters Patent granted to me January 19, 1904, and numbered 749,912.

In the drawings, 1 represents the base or foundation block of the device, which is suitably supported upon a floor or other foundation. The base is preferably made hollow, of cast-iron, of sufficient strength and rigidity to withstand the stroke incident to the operation of the hammer, to be described later.

On top of the base 1 is an anvil-block 2, retained by any suitable means, such as bolts or other equivalent means. On the upper part of this anvil-block 2 is the die 3, commonly known as the "nipple," around which the link is welded under the strokes of the hammer. The rear end of the anvil-block 2 is bifurcated and between the two arms thereof extends a pivot 4, on which is mounted the hammer-helve 5. On the upper end of this helve is the hammer-head 6, bearing a die 7, which is adapted to coöperate with the nipple 3 in welding the chain-links.

Extending from one side of the base 1 are two arms 8, connected at their upper ends by a cross-rod 9, to which is attached a coiled spring 10, the lower end of which is adapted to engage the free end of the helve portion 5 of the hammer. In the drawings only one of these arms 9 is shown, the other being omitted to better illustrate the mechanism of the device. The tendency of the spring 10 is to draw upward the end of the hammer-helve to which it is attached and produce a corresponding downward stroke of the head portion 6 of the hammer. To the lower rear portion of the base 1 are attached journal-boxes 11, between which extends a transverse shaft 12, to the central portion of which is united an oscillating arm 13, which is connected by a pair of links 14 to the lower portion of the hammer-helve 5.

Mounted in proper position with respect to the position of the hereinbefore-mentioned mechanism are a pair of upright hangers 15, rotatably sustaining in their upper ends a shaft 16, on which is mounted a cam 17, so positioned as to engage the outer free end of the oscillating arm 13. Power is communicated to this shaft 16 in any suitable way, such as by means of a belt and pulley or any other way which may be deemed preferable by the operator. As the cam 17 revolves in the direction of the arrow it gradually depresses the outer end of the oscillating arm 13, which being pivoted on the shaft 12 produces a downward movement in the links 14, which overcoming the influence of the coiled spring 10 gradually raises the head portion 6 of the hammer until the cut-away portion of the cam 17 has passed from engagement with the oscillating arm 13, at which time the head of the hammer descends upon the nipple 3 with the combined force of gravity and the energy of the spring 10.

Of course it will be obvious that as long as the revolution of the cam is maintained the hammer will rise and fall.

Any suitable means may be used for maintaining the hammer-head at the upper end of its stroke which will best subserve the purposes of the user of this device; but as this forms no part of my invention its incorporation into this case is not believed to be necessary.

I find in practice that it is preferable to mount my improved link-forming device as close to the nipple 3 as possible, so that the link may be shaped while at a welding heat and may be turned over and placed in position around the nipple 3 to be immediately acted upon by the die 7, carried by the hammer-head 6.

To properly shape the links as before described I employ the following mechanism: In a cut-out portion of the anvil-block 2, whose sides are substantially at right angles to each other, I place a fulcrum-block 18, having a bifurcated upper end 19, through which passes a pivot-pin 20. The lower portion of this fulcrum-block is formed into an angle-plate and fits against the right-angled opening formed in the anvil-block 2. The front face of this fulcrum is provided with a dovetail strip integral therewith, (designated by the reference-numeral 21,) and this is adapted to enter a correspondingly-formed opening in the anvil-block 2, whereby the fulcrum-block is permitted to slide vertically, but is held against unintentional lateral displacement. Across the lower portion of the open part of this fulcrum-block is a web 22, provided with a threaded opening through which passes an adjusting-screw 23, the threads of which are arranged to mesh with the threads in the opening in the web 22, and the lower end of said screw 23 enters an upturned lug 24, integral with the anvil-block 2, which is provided with any ordinary means for rotatably retaining the end of a screw.

When it is desired to raise the entire fulcrum-block 18, a suitable tool is applied to the upper end of the screw 23 and it is rotated in a direction to cause the fulcrum-block to rise, due to the engagement of the threads on the screw 23 with the threads in the opening in the web 22, and as the lower end of the screw is held against depression by reason of its engagement with the lug 24 the movement of the fulcrum-block is accomplished. In order to lower the fulcrum-block 18, the reverse of the foregoing operation is employed.

In order to effectually maintain the fulcrum-block in position and add materially to its strength, I insert between the lug 24 and the side of the fulcrum-block a wedge-block 25, which forces the sides of the block into close engagement with the sides of the opening in which it is seated.

Pivoted on the pin 20 in the upper bifurcated end of the fulcrum-block is an oscillating lever 26, the rear end of which is formed, preferably, upon curvilinear lines and is downwardly bent and adapted to ride upon a cam 27, mounted on the shaft 16. The operation of this cam 27 alternately raises the rear end of the oscillating lever 26 and forces downward the front or working end thereof. The front working end of the lever 26 contains suitable mechanism for grasping and shaping the link. This mechanism consists of a jaw 28, fastened, by means of a bolt 29, to the lever 26. This bolt 29 passes through a longitudinal slot 30 in the jaw 28 and also through a vertical slot 31 in the head of the lever 26, so that the relative position of the jaw 28 on the lever 26 may be adjusted. The place where the jaw 28 is placed on the lever 26 is hollowed out to receive it, and through the metal surrounding this hollowed-out portion are passed a number of adjusting-screws 32, by which the position of the jaw 28 is regulated and effectually maintained.

In the front lower edge of the jaw member 28 is a notch 33, forming a shoulder. Mounted in the front face of the anvil-block 2 is a post 34, having one inclined side and retained in position by such means as bolts 35. On one side of the post 34 is a pin 36, over which one leg of the link is laid when being bent by the jaw 28. If the metal constituting the link is unusually heavy and the ordinary grasp of an operator thereon would be insufficient to sustain the link in position during the bending of the end thereof, I place on front face of the post 34 a plate 37, sustained by bolts or other suitable means, and on this plate 37 I place in a suitable location a pin 38. The position of this pin 38 will be such that when a downward force is exerted on the front extended end of the link the pin 36 will constitute a fulcrum, and the upward movement of the rear end of the link will be resisted by this pin 38.

In using this device as thus far described the links are placed therein in the position and form shown in Fig. 2, and as the cam 17 revolves and raises the rear end of the lever 26 the front end thereof descends and the notch 33 engages the end of the link and bends it over the pin 36. The link is then withdrawn and the opposite leg thereof inserted and treated in exactly the same manner as has been described with reference to the first leg.

It is obvious that in order to bend the ends of the legs of the links into the position shown in Fig. 4, where they are shown as overlapping each other, it will be necessary to hold the links at an incline, as the action of the jaw 28 is absolutely vertical.

In order to properly hold the links in position and to accurately determine the inclination which they will be held at while undergoing the shaping process, the inclined side 40 of the post 34 is provided with a groove 41, which (if preferred) may have a dovetailed conformation and into which are slipped detachable liners 39, each consisting of wedge-shaped blocks of suitable material having their under surfaces suitably conformed to engage in the groove 41 on the inclined face 40 of the post 34. In Fig. 7 is shown one of these liners 39 being placed in position.

It will be obvious, of course, that these liners 39 may be changed to suit the requirements of different cases.

It will be further apparent that the positions of the pins 36 and 38 may be altered considerably without in any manner departing from the scope of this invention.

What I claim, and desire to secure by Letters Patent, is—

1. The combination in a device of the class described, of a supporting-block, a fulcrum-block slidably mounted in suitable ways in said supporting-block, means to adjust the position of said fulcrum-block, a rocking lever pivotally mounted in the upper end of said fulcrum-block having the forward end thereof recessed, a shaft rotatably mounted adjacent said supporting-block, a cam on said shaft arranged to engage and alternately raise the other end of said lever, a link-blank-forming die mounted in the recess in said lever, a post having one inclined face mounted on said supporting-block adjacent said die, pins on said post for sustaining a link-blank operatively in position to be engaged by said die when the die-bearing end of said lever is depressed by the action of said cam.

2. The combination in a device of the class described, of a supporting-block, a fulcrum-block slidably mounted in suitable ways in said supporting-block, means to adjust the position of said fulcrum-block, a rocking lever pivotally mounted in the upper end of said fulcrum-block and provided with means for holding a die in the forward end thereof, a shaft rotatably mounted adjacent said supporting-block, a cam on said shaft arranged to engage and alternately raise the other end of said lever, a link-blank-forming die mounted on the forward end of said lever, a post mounted on said supporting-block adjacent said die, means carried by said post for sustaining a link-blank operatively in position to be engaged by said die when the die-bearing end of said lever is depressed by the action of said cam.

3. The combination in a device of the class described, of a supporting-block, a fulcrum-block slidably mounted in suitable ways in said block, means to adjust the position of said fulcrum-block, a rocking lever pivotally mounted in the upper end of said fulcrum-block having the forward end thereof recessed, a shaft rotatably mounted adjacent said supporting-block, a cam on said shaft arranged to engage and alternately raise the other end of said lever, a link-blank-forming die mounted in the recess in said lever, a post having one inclined face mounted on said supporting-block adjacent said die, pins on said post for sustaining a link-blank operatively in position to be engaged by said die when the die-bearing end of said lever is depressed by the action of said cam, a wedge-shaped liner adapted to be mounted on the inclined face of said post whereby the inclination thereof may be varied.

4. The combination in a device of the class described, of a supporting-block, a fulcrum-block slidably mounted in suitable ways in said block, means to adjust the position of said fulcrum-block, a rocking lever pivotally mounted in the upper end of said fulcrum-block having the forward end thereof recessed, a shaft rotatably mounted adjacent said supporting-block, a cam on said shaft arranged to engage and alternately raise the other end of said lever, a link-blank-forming die mounted in the recess in said lever and provided with a shoulder to constitute a stop, means for adjusting and securing said die in said recess, a post mounted on said supporting-block adjacent said die, pins on said post for sustaining a link-blank operatively in position to be engaged by said die when the die-bearing end of said lever is depressed by the action of said cam.

In testimony whereof I have hereunto set my hand in presence of two subscribing witnesses.

WALLACE N. APPLETON.

Witnesses:
C. E. HUMPHREY,
GLENARA FOX.